(12) United States Patent
Furui (10) Patent No.: US 7,567,007 B2
(45) Date of Patent: Jul. 28, 2009

(54) MOTOR AND METHOD FOR MANUFACTURING THE MOTOR

(75) Inventor: Nobuyasu Furui, Anjo (JP)

(73) Assignee: Makita Corporation, Aichi-Ken (JP)

( * ) Notice: Subject to any disclaimer, the term of this patent is extended or adjusted under 35 U.S.C. 154(b) by 427 days.

(21) Appl. No.: 11/411,442

(22) Filed: Apr. 26, 2006

(65) Prior Publication Data

US 2006/0244334 A1   Nov. 2, 2006

(30) Foreign Application Priority Data

Apr. 27, 2005   (JP)   ............... 2005-129862

(51) Int. Cl.
*H02K 23/38* (2006.01)
(52) U.S. Cl. .................................... 310/198
(58) Field of Classification Search ................ 310/130, 310/184, 198, 220, 223, 225, 234, 265
See application file for complete search history.

(56) References Cited

U.S. PATENT DOCUMENTS

| | | | | |
|---|---|---|---|---|
| 3,733,506 A | * | 5/1973 | Jaffe et al. | 310/198 |
| 3,829,721 A | * | 8/1974 | Rosenthal, Jr. | 310/47 |
| 4,876,472 A | * | 10/1989 | Shiraki et al. | 310/198 |
| 6,683,396 B2 | * | 1/2004 | Ishida et al. | 310/50 |

FOREIGN PATENT DOCUMENTS

| | | |
|---|---|---|
| EP | 1 650 853 A1 | 10/2005 |
| EP | 1 650 883 A2 | 10/2005 |
| GB | 1299057 | 12/1972 |
| JP | 02-184246 | 7/1990 |
| JP | 11252843 A | 9/1999 |
| JP | 2004274821 A | 9/2004 |

OTHER PUBLICATIONS

European Search Report; Dated Oct. 15, 2007.

* cited by examiner

*Primary Examiner*—Tran N Nguyen
(74) *Attorney, Agent, or Firm*—Orrick Herrington & Sutcliffe LLP (57) ABSTRACT

Object of the invention is to provide an improved technique for winding a wire to form an armature winding between a commutator and an armature. Representative motor is provided with a motor with an armature having slots, a commutator, and segments on the commutator and an armature winding having first and second unit windings. The first unit winding is defined by a first to a third segments, a coil of a first group and a coil of a second group in series, and a first equalizing wire. The second unit winding of the motor is defined by a third to a fifth segments, a coil of a first group and a coil of a second group for the second unit winding, and a second equalizing wire. The coils are disposed in series with this order and in a position shifted from the coils of the first and the second groups for the first unit winding. The third segment defines an endpoint of the first unit winding and also defines a starting point of the second unit winding. With such construction, the wire for forming the armature winding can be wound between the commutator and the armature in a balanced manner.

2 Claims, 11 Drawing Sheets

MOTOR AND METHOD FOR MANUFACTURING THE MOTOR

CROSS REFERENCE

This application claims priority to Japanese patent application number 2005-129862 filed Apr. 27, 2005, the contents of which are hereby incorporated by reference as if fully set forth herein.

BACKGROUND OF THE INVENTION

1. Field of the Invention

The present invention relates to a motor and a method for manufacturing the motor and more particularly, to a technique for effectively winding a wire for forming an armature winding, between a commutator and an armature.

2. Description of the Related Art

In a known DC motor, the same number of brushes as the number of poles of a stator is provided. However, the resistance loss caused by friction between a commutator and the brushes during rotation of an armature may increase with increase in the number of brushes. Further, the number of parts increases as the number of brushes increases. In this connection, Japanese non-examined laid-open Patent Publication No. 2-184246 discloses a motor which can be driven while having a four-pole stator and two brushes by connecting diametrically opposed segments of a commutator by an equalizing wire such that the coils connected to the opposed segments are electrically equalized.

According to a known method of forming a wire connection (hereinafter referred to as "unit winding") including two electrically equalized coils and an equalizing wire, one of the coils is formed by winding a wire connected to a starting-point segment, around a predetermined slot group of slots, the other coil is subsequently formed by winding the wire around a slot group of slots which is diametrically opposed to said slot group. Then, the equalizing wire is formed by connecting the wire from the other coil to a relay segment and then to an endpoint segment. Further, unit windings of the same kind are formed by repeating the above-mentioned procedure, while shifting the starting-point segment by one segment in the circumferential direction around the axis of the commutator. Thus, the two coils of each of the unit windings are successively formed while shifting one slot in the circumferential direction around the axis of the armature. In this manner, an armature winding is formed between the armature and the commutator.

In such a case, the wires are sequentially connected in a regular manner from a segment which is shifted by one segment in the circumferential direction around the axis of the commutator, to a slot which is shifted by one slot in the circumferential direction around the axis of the armature. As a result, the wires connected between the commutator and the armature tend to regularly overlap each other, so that imbalance in the wire volume is created. As a result, the rotor, which is formed by the output shaft, the armature, the commutator and the armature winding, has an imbalance in weight and thus the center of rotation of the rotor tends to be displaced from the output shaft.

SUMMARY OF THE INVENTION

It is an object of the invention to provide an improved technique for winding a wire to form an armature winding between a commutator and an armature in a balanced manner.

The object is achieved by providing a motor which includes an armature having a plurality of slots, a commutator that rotates together with the armature, a plurality of segments provided on the commutator in the circumferential direction around the axis of the commutator, and an armature winding having at least a first and a second unit windings formed between the armature and the segments. The "motor" in this invention is typically a DC motor or an AC commutator motor and may embrace a motor in which the commutator and the brushes commutate the current passing through the armature winding.

The first unit winding of the motor according to this invention is defined by a first to a third segments of the plurality of the segments, a coil of a first group and a coil of a second group for the first unit winding which are formed by winding the wire around respectively predetermined slot groups of slots selected from said plurality of the slots, and a first equalizing wire.

The first segment defines a starting point of the first unit winding. The coil of the first group for the first unit winding and the coil of the second group for the first unit winding are connected in series in this order by winding the wire from the first segment to the second segment. The first equalizing wire is connected from the second segment to the third segment that defines an endpoint of the first unit winding.

Thus, in the motor of this invention, the first unit winding is formed by sequentially connecting the first segment of the starting point, the coil of the first group, the coil of the second group, the second segment and the third segment of the endpoint, in this order. The first unit winding must include at least the first to the third segments of all the segments and may include other segments. Further, the first unit winding must include at least the coil of the first group and the coil of the second group and may include coils of other groups. Typically, within the first unit winding, the number of groups of coils is equal to the number of the segments which are connected by the equalizing wire.

Further, the second unit winding of the motor according to this invention is defined by a third to a fifth segments of the plurality of the segments, a coil of a first group and a coil of a second group for the second unit winding, and a second equalizing wire. The coils for the second unit winding are formed by winding the wire around respectively predetermined slot groups of slots which are selected from the plurality of the slots in such a manner as to include some of the slots of the slot groups used to form the coils of the first and the second groups for the first unit winding. The coils are disposed in a position shifted from the coils of the first and the second groups for the first unit winding in the circumferential direction around the axis of the armature.

The third segment defines an endpoint of the first unit winding and also defines a starting point of the second unit winding. The coil of the second group for the second unit winding and the coil of the first group for the second unit winding are connected in series in this order by winding the wire from the third segment to the fourth segment. The second equalizing wire is connected from the fourth segment to the fifth segment that serves as an endpoint of the second unit winding.

Thus, in the motor of this invention, the second unit winding is formed by sequentially connecting the third segment of the starting point, the coil of the second group, the coil of the first group, the fourth segment and the fifth segment of the endpoint, in this order. The second unit winding must include at least the third to the fifth segments of all the segments and may include other segments. Further, the second unit winding must include at least the coil of the first group and the coil of the second group and may include coils of other groups.

Typically, within the second unit winding, the number of groups of coils is equal to the number of the segments which are connected by the equalizing wire. Further, the number of groups of coils and the number of the segments which are connected by the equalizing wire, within the second unit winding, are respectively equal to those in the first unit winding. Further, the armature winding must include one or more first unit windings and one or more second unit windings, and may include other unit windings. In forming other unit windings, the numbers of coils and segments and the order in which the groups of coils are connected and the order in which the segments are connected may be selected as desired.

Specifically, in the motor according to the invention, two kinds of unit windings are provided in which groups of coils in a unit winding of one kind are connected from a starting-point segment to an endpoint segment in a different order from those in a unit winding of the other kind. Therefore, the number of times that the wires are sequentially connected from a segment shifted by one segment to a slot shifted by one slot can be reduced. Thus, problem in the prior art that the wires connected between the commutator and the armature tend to regularly overlap each other to create an imbalance in the wire volume can be alleviated. As a result, the wire for forming the armature winding can be wound between the commutator and the armature in a balanced manner.

Further, according to the representative motor, the prior art problem can be avoided that the rotor, the armature, the commutator and the armature winding results imbalance in weight causing a deviation of rotating center the rotor from the output shaft, can be avoided. Therefore, in the process of manufacturing the motor, it is not necessary to take time for adjustment of the balance, for example by reducing the weight by partially cutting away the commutator or the armature.

Preferably, the third segment of the first unit winding may be disposed adjacent to the first segment, and the fourth segment of the second unit winding may be disposed adjacent to the third segment.

By such construction, the segments for forming the equalizing wire in the first unit winding are connected in a different order from those in the second unit winding. In the first unit winding, the third segment serving as an endpoint segment is disposed adjacent to the first segment serving as a starting-point segment. The third segment serves as a starting-point segment of the second unit winding. Therefore, the starting-point segment of the second unit winding is disposed adjacent to the starting-point segment of the first unit winding. In the second unit winding, the fourth segment to which the end of the coil is connected is disposed adjacent to the third segment serving as a starting-point segment. The fifth segment to which the fourth segment is connected by an equalizing wire can serve as a starting-point segment of the subsequently formed unit winding. Therefore, the starting-point segment of the unit winding which is formed subsequently to the second unit winding is not disposed adjacent to the starting-point segment of the second unit winding.

According to the representative motor, a difference is made between the first unit winding and the second unit winding in the order in which the segments for forming the equalizing wire are connected. Thus, in the armature winding formed by a plurality of unit windings, the problem that the segments shifted by one segment in the circumferential direction around the axis of the commutator are uniformly configured as a starting-point segment can be avoided. As a result, the imbalance of the wire volume between the commutator and the armature winding is prevented.

In the motor manufacturing method according to the invention, the first unit winding is formed by connecting the wire connected to the first segment of the starting point, to the coil of the first group, the coil of the second group, the second segment and the third segment of the endpoint in this order. Subsequently, the second unit winding is formed by connecting the wire from the third segment of the starting point to the coil of the second, the coil of the first group, the fourth segment and the fifth segment of the endpoint in this order.

Specifically, in the motor manufacturing method of this invention, a difference is made between the first unit winding and the second unit winding in the order in which groups of coils are connected from the starting-point segment to the endpoint segment. the wires connected between the commutator and the armature can be prevented from regularly overlapping each other to cause imbalance in the wire volume.

Preferably, a plurality of unit windings of the same kind as the first unit winding may be formed by repeating the step of forming the first unit winding and thereafter, a plurality of unit windings of the same kind as the second unit winding are formed by repeating the step of forming the second unit winding.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide improved motors and method for using such motors and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

A representative embodiment according to the invention will now be described with reference to FIGS. 1 to 4. A "motor" of the present invention is described as a driving motor provided in a battery-powered electric impact driver 100. The driving motor is provided as a four-pole two-brush DC motor. Diametrically opposed segments on the commutator are connected by a wire and equalized (an equalizing wire is formed), while diametrically opposed coils on the armature are connected in series.

Figure 1:
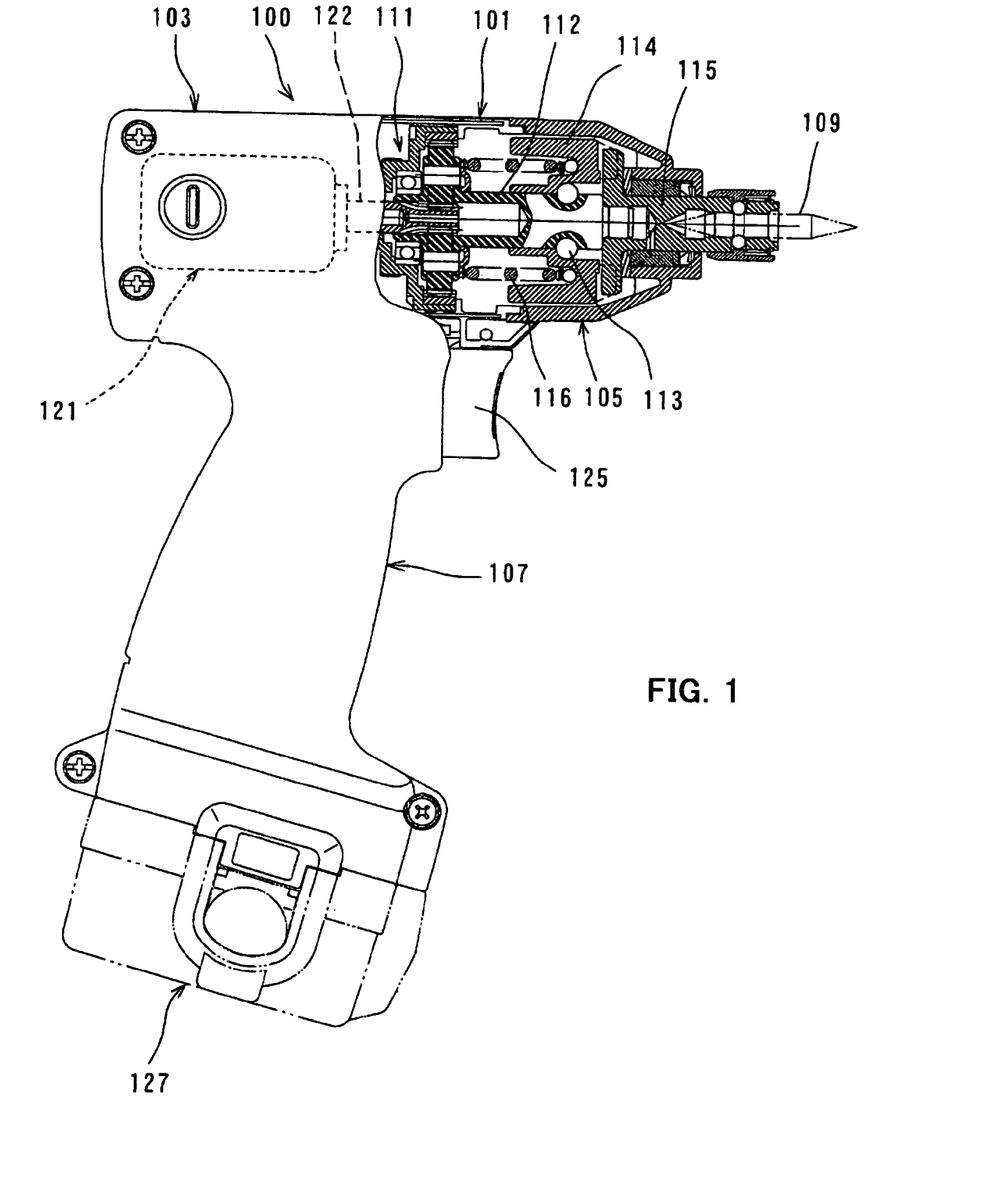
FIG. 1 shows an entire impact driver 100 as an example of a power tool to which a motor of the present invention is applied as a driving motor.
Figure 2:
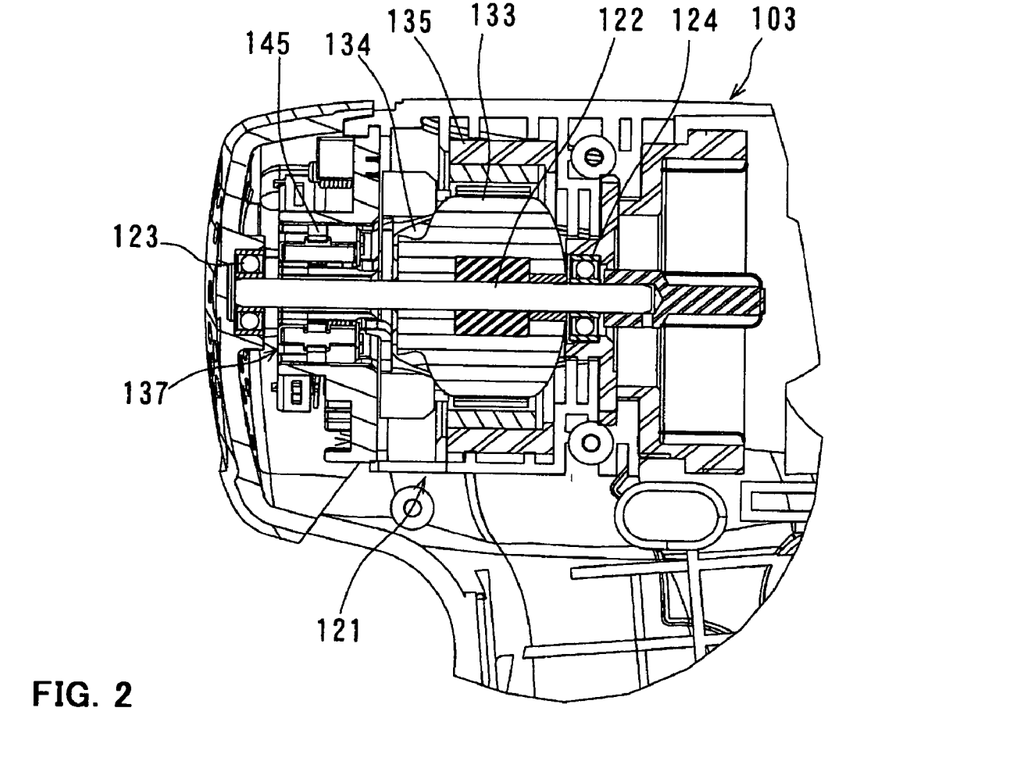
FIG. 2 is a sectional side view showing a driving motor 121 of the impact driver 100.
Figure 3:
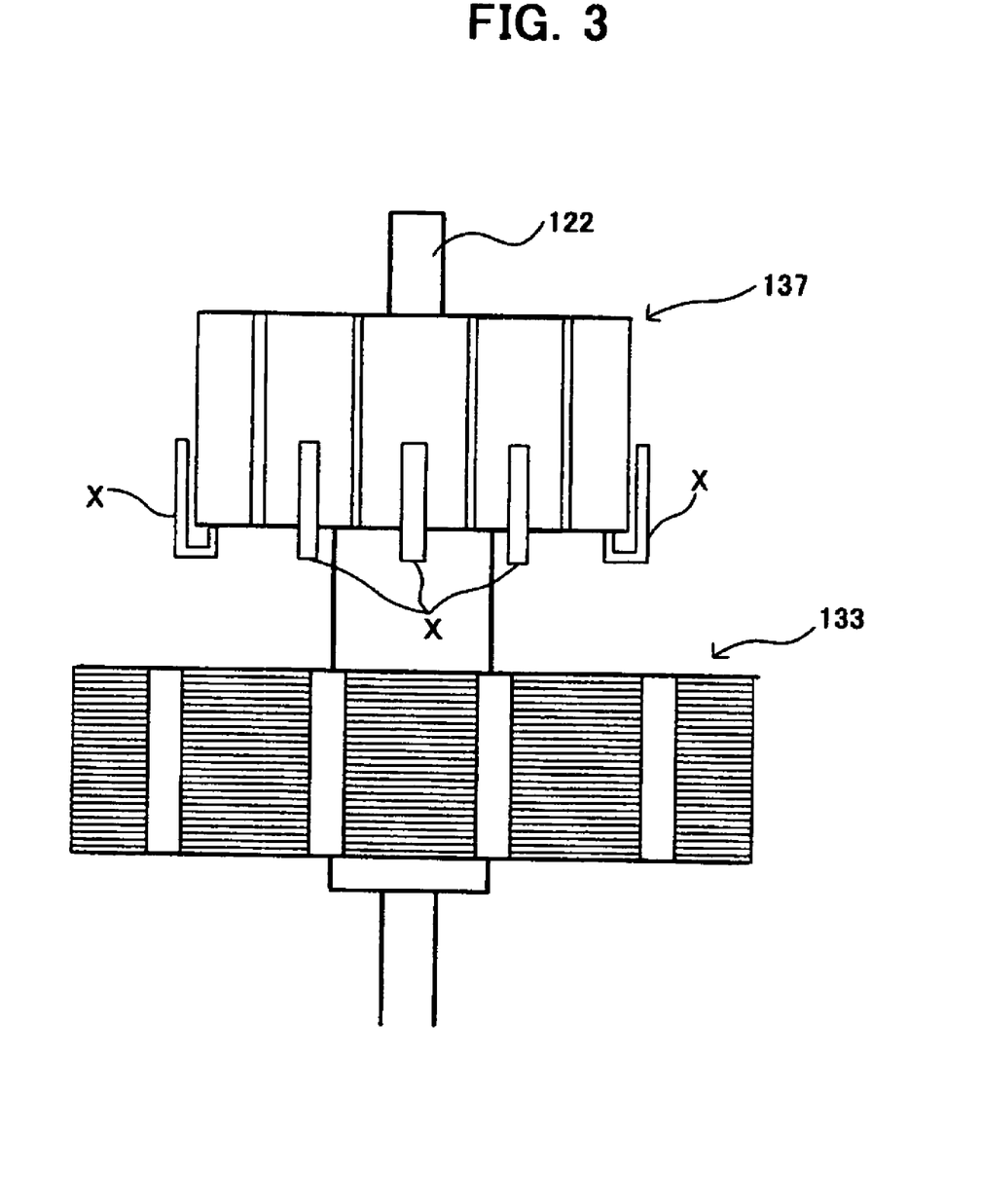
FIG. 3 schematically shows a rotor in the driving motor 121 on which an armature winding 134 is not yet formed.
Figure 16:
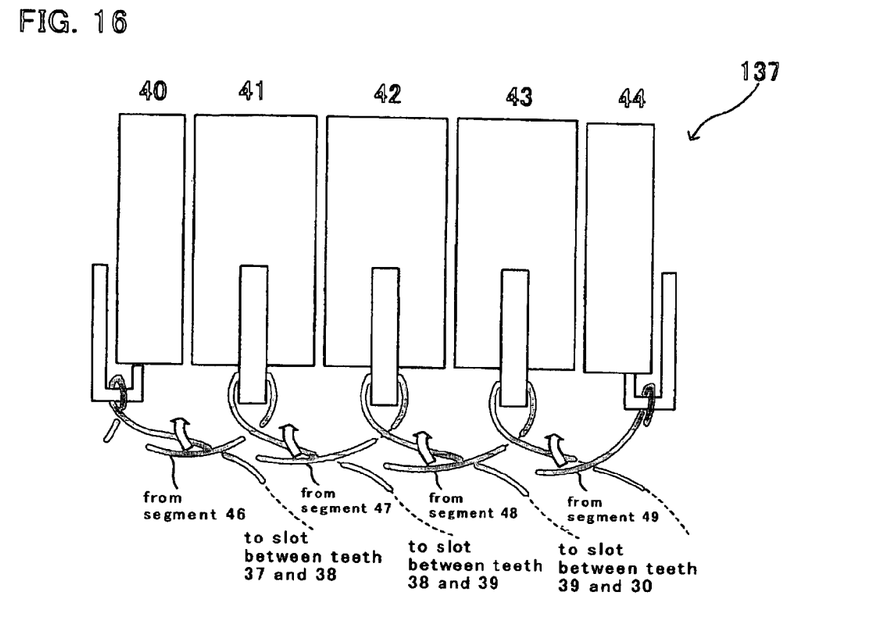
FIG. 16 illustrates an example of wiring in which wires regularly overlap each other so that imbalance is created in the volume of the wires wound between the segments and the slots.
Figure 17:
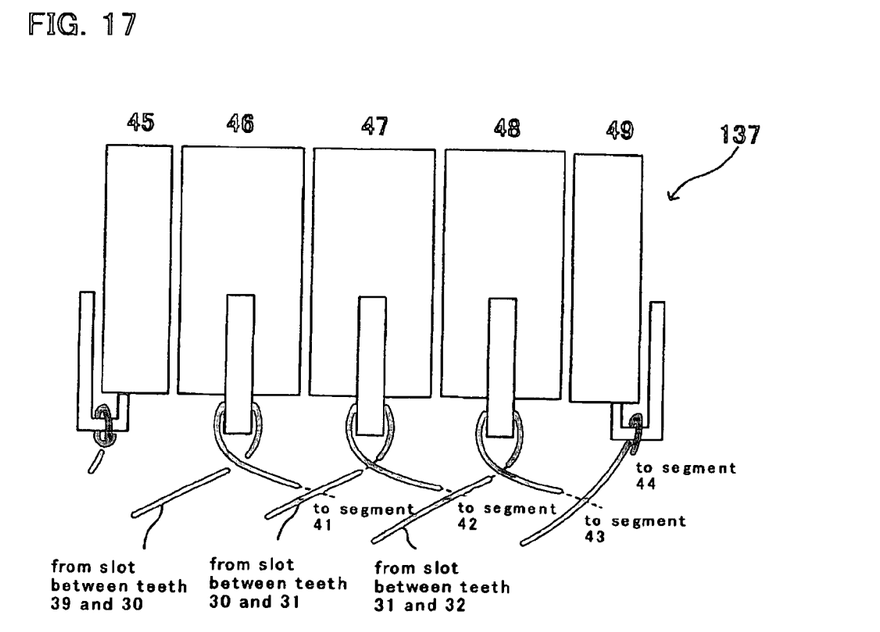
FIG. 17 illustrates an example of wiring in which wires regularly overlap each other so that imbalance is created in the volume of the wires wound between the segments and the slots.
Figure 18:
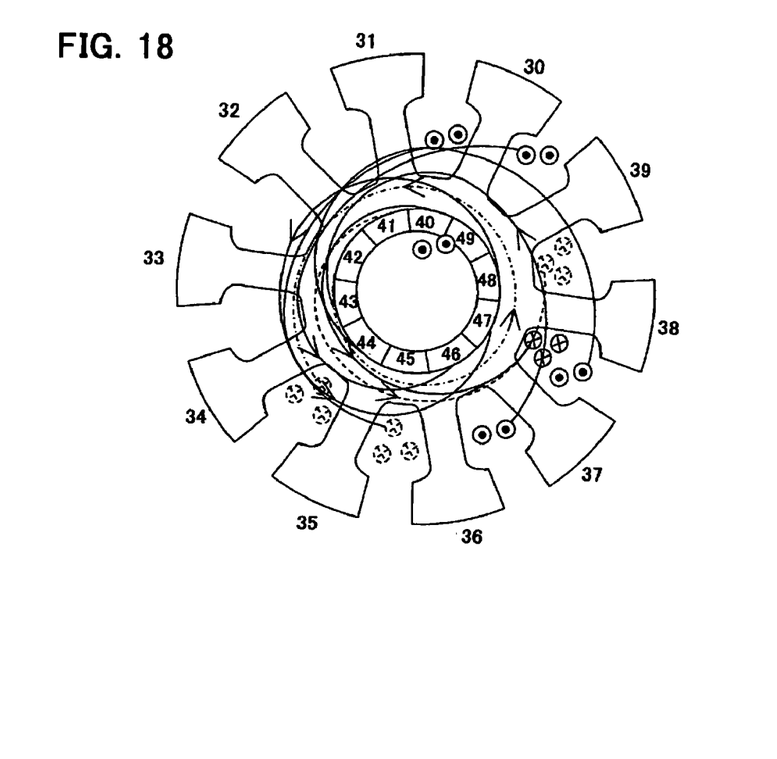
FIG. 18 shows part of the wire wound between the segments and the slots and forming the coils of the armature winding in this embodiment.
Figure 19:
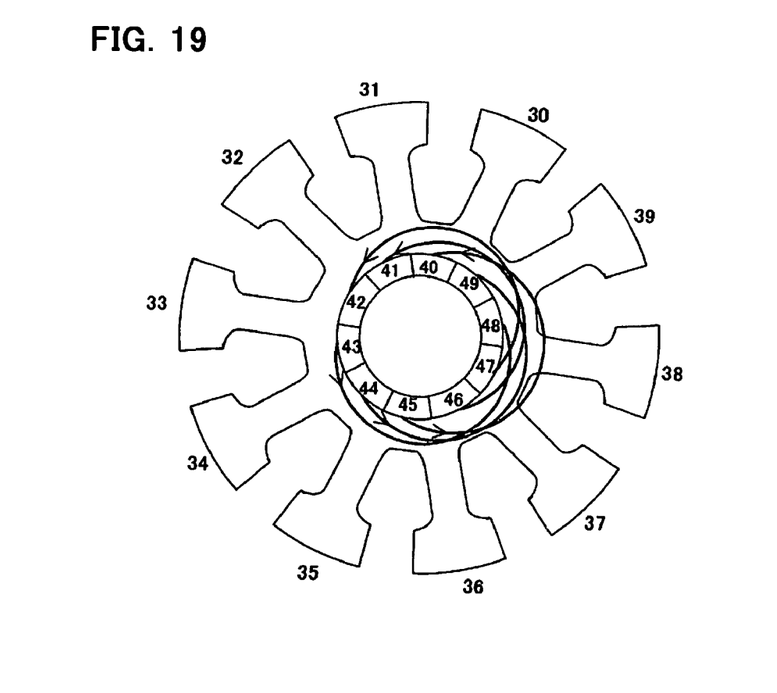
FIG. 19 shows equalizing wires connecting the segments in this embodiment.

FIG. 1 is a side view, partly in section, schematically showing the entire impact driver 100. FIG. 2 is a sectional view showing the structure of the driving motor of the impact driver 100. FIG. 3 schematically shows a rotor in the driving motor on which an armature winding is not yet formed. FIGS. 4, 6, 8, 10 and 12 are developed views of segments and slots, which illustrate the wiring of wires of the armature winding of the driving motor which are wound between the segments and the slots. FIGS. 5, 7, 9, 11, 13 and 17 are sectional views of the armature and the commutator, which illustrate the wiring of the wires. FIGS. 14 to 17 illustrate examples of wiring in which wires regularly overlap each other so that imbalance is created in the volume of the wires wound between the armature and the commutator. FIG. 18 shows part of the wire wound between the segments and the slots and forming the coils of the armature winding in this embodiment. FIG. 19 shows equalizing wires connecting the segments.

As shown in FIG. 1, the impact driver 100 according to the representative embodiment includes a body 101 and a driver bit 109. The driver bit 109 is detachably coupled to the tip end region of the body 101 and adapted to tighten various types of screws. The body 101 includes a motor housing 103, a gear housing 105 and a handgrip 107. The motor housing 103 houses a driving motor 121. A trigger 125 is mounted on the handgrip 107, and depressing the trigger 125 turns on a power switch of the driving motor 121.

The gear housing 105 houses a speed reducing mechanism 111, a spindle 112, a hammer 114 and an anvil 115. The speed reducing mechanism 111 includes a planetary gear and appropriately reduces the speed of rotation of an output shaft 122 of the driving motor 121. The spindle 112 is rotated by the speed reducing mechanism 111. The rotation of the spindle 112 causes the hammer 114 to rotate via a transmitting member in the form of a ball 113, which in turn causes the anvil 115 to rotate. The hammer 114 can move with respect to the spindle 112 in its longitudinal direction and is urged toward the anvil 115 by a compression coil spring 116. An end of the anvil 115 protrudes from the end of the gear housing 105, and the driver bit 109 is detachably coupled to the protruded end of the anvil 115.

With the impact driver 100 thus constructed, when the tightening torque of the driver bit 109 is increased to a predetermined high level, high tightening torque is produced on the driver bit 109 by the hammering movement of the hammer 114.

The construction of the driving motor 121 will now be described with reference to FIG. 2. The driving motor 121 in this embodiment is a four-pole DC motor powered by the battery 127 (also see FIG. 1). The driving motor 121 includes an output shaft 122, an armature 133, a stator 135, a commutator 137 and two brushes 145. The armature 133 rotates together with the output shaft 122, and coils that form an armature winding 134 are wound on the armature 133. The stator 135 is secured to the motor housing 103 and generates a magnetic field around the armature 133. The commutator 137 is fitted onto the output shaft 122 near its end (which is remote from the speed reducing mechanism 111). The two brushes 145 supply driving current to the armature winding 134 on the armature 133 in sliding contact with a plurality of segments provided on the outside surface of the commutator 137.

One end (the rear end or the left end as viewed in FIG. 2) of the output shaft 122 is rotatably supported on the motor housing 103 via a bearing 123. The other end (on the side of the speed reducing mechanism or the right side as viewed in FIG. 2) of the output shaft 122 is rotatably supported on the gear housing 105 via a bearing 124. The output shaft 122, the armature 133 and the commutator 137 form a rotor.

When the power to the driving motor 121 having the above construction is turned on, driving current is supplied to the armature winding 134 of the armature 133 within the magnetic field of the stator 135, via the brushes 145 and the segments of the commutator 137, which causes the rotor to rotate. At this time, the commutator 137 and the brushes 145 appropriately change the direction of current that passes through the armature winding 134 such that the armature 133 and the output shaft 122 can continuously rotate in a predetermined direction.

FIG. 3 shows the external view of the rotor on which a wire for forming the armature winding 134 is not yet wound. The commutator 137 is fitted onto the end of the output shaft 122 that is inserted through the center of the armature 133. Ten segments 40-49 (see FIG. 5) are formed on the outside surface of the commutator 137 and the brushes 145 come in sliding contact with the segments one after another. A connecting section X for connecting the wire is provided on each of the segments. Adjacent segments are insulated from each other.

The armature 133 has ten radially extending teeth 30-39 (see FIG. 5) and is thus shaped liked a gear in section. Ten slots are formed between the adjacent teeth 30-39 and a wire of coils that form the armature winding 134 is wound between the slots.

The method of forming the coils of the armature winding 134 will be explained in detail with reference to FIGS. 4 to 13. The armature winding 134 of the embodiment comprises a first winding starting from a segment 40 (see FIGS. 4 and 5), a second winding starting from a segment 41 (see FIGS. 6 and 7), a third winding starting from a segment 42 (see FIGS. 8 and 9), a fourth winding starting from a segment 48 (see FIGS. 10 and 11), and a fifth winding starting from a segment 49 (see FIGS. 12 and 13).

Each of the five windings is defined by the above-mentioned assigned starting-point segment, a coil of group A, a coil of group B diametrically opposed to the coil of group A in the armature 133, a relay segment, and an end-point segment connected to the relay segment. A coil section having the coil of group A and the coil of group B connected in series is connected to the starting-point segment at one end and to the relay segment at the other end. Further, the relay segment and the end-point segment are diametrically opposed to each other in the armature 133.

The coil of group A of each winding formed subsequently to other winding is wound between the slots respectively shifted by one slot in the circumferential direction around the axis of the armature 133 from the slots between which the coil of group A of the other winding is wound. Likewise, the coil of group B of each winding which is formed subsequently to other winding is wound between the slots which are respectively shifted by one slot in the circumferential direction around the axis of the armature 133 from the slots between which the coil of group B of the other winding is wound.

Specifically, the first to the fifth windings are sequentially formed by the wire connected to the starting-point segment of the first winding (the segment 40) while each of the end-point segments of the windings serves as the starting-point segment of the next winding. As a result, the coils of the same group are provided cyclically while shifting in the circumferential direction around the axis of the armature 133.

Further, a wire that connects a relay segment and an end-point segment is short-circuiting the segments and therefore referred to as an equalizing wire. The first to the fifth windings in this embodiment correspond to the "unit windings" in this invention.

In order to form the coils of the first and the second windings, the wire is wound from the starting-point segment to the relay segment, via the coil of group A and the coil of group B in this order. As for the third to fifth windings, the wire is wound from the starting-point segment to the relay segment, via the coil of group B and the coil of group A in this order.

Arrows shown on the wire in the drawings indicate the direction of winding the wire (and not the direction of flow of the driving current). Further, a wire which is led from a segment to the armature 133 (a wire that forms a coil section) is neck-wound at least a half turn around the output shaft 122 between the commutator 137 and the armature 133 before routed through a slot in order to prevent the wire from breaking due to vibration.

Figure 4:
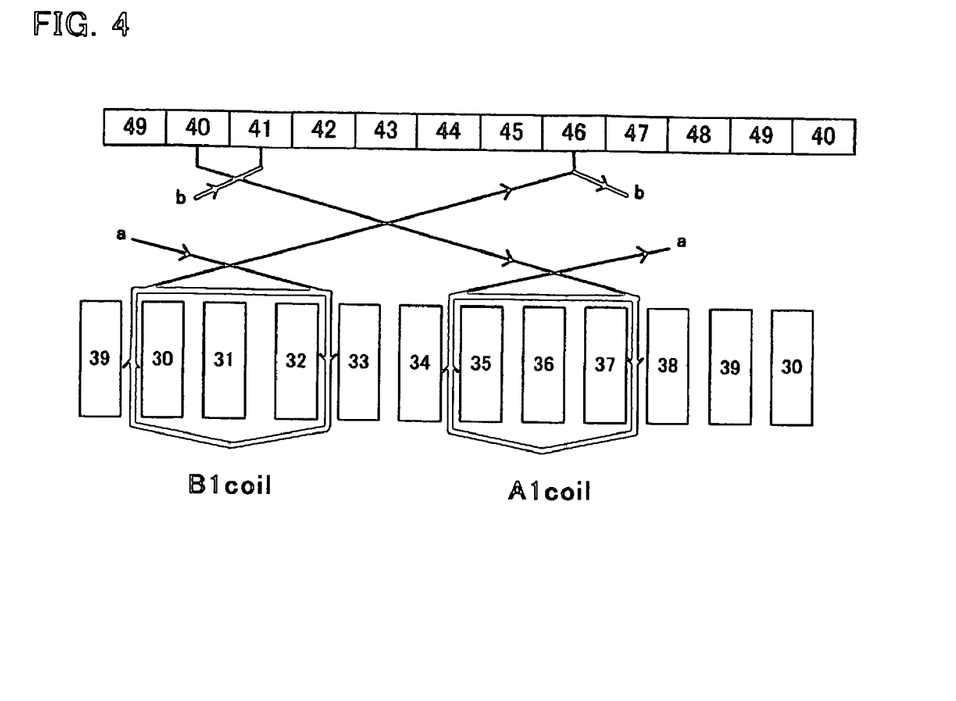
FIG. 4 illustrates the wiring of a wire of the first winding by showing segments and slots in developed view.
Figure 5:
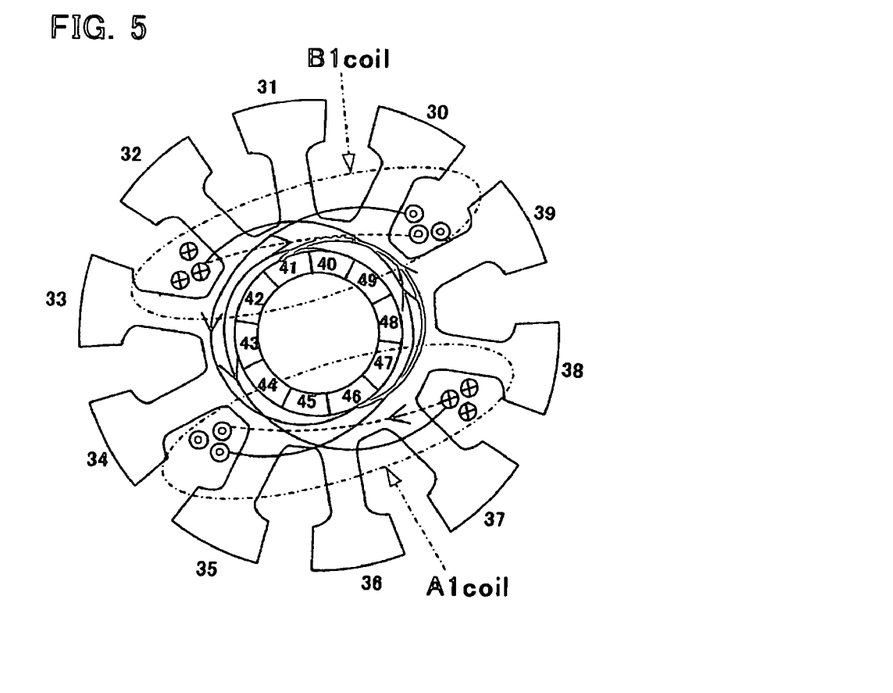
FIG. 5 illustrates the wiring of the wire of the first winding by showing an armature 133 and a commutator 137 in sectional view.

As shown in FIGS. 4 and 5, the first winding is formed by winding a wire from a starting-point segment or the segment 40. The wire connected to the segment 40 is wound counterclockwise as viewed in FIG. 5, inserted through a slot between the teeth 37 and 38, passed over the teeth 37, 36, 35 and then inserted through a slot between the teeth 34 and 35. A coil A1 is formed by thus winding the wire eight turns between these slots.

Next, the wire is continuously wound counterclockwise, inserted through a slot between the teeth 32 and 33 (as shown by arrow a in FIG. 4), passed over the teeth 32, 31, 30 and then inserted through a slot between the teeth 30 and 39. A coil B1 is formed by thus winding the wire eight turns between these slots. The coil B1 is diametrically opposed to the coil A1 in the armature 133.

Then, the wire is wound counterclockwise again and connected to a relay segment or the segment 46. In this manner, by the wire connected to the segment 40, the coil A1 is formed and then the coil B1 is formed between the slots which are diametrically opposed to the slots for the coil A1 in the armature 133. Thus, the coil section of the first winding is formed with the coils A1 and B1 connected in series.

Thereafter, the wire connected to the segment 46 is connected to an end-point segment of the first winding, or the segment 41 (as shown by arrow b in FIG. 4) and the segments 41 and 46 are equalized (an equalizing wire for the first winding is formed).

Figure 6:
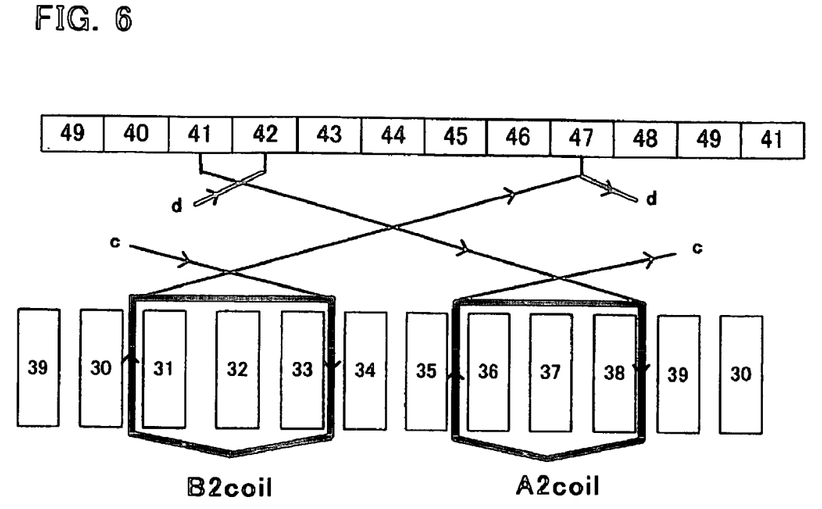
FIG. 6 illustrates the wiring of the wire of the second winding by showing the segments and slots in developed view.
Figure 7:
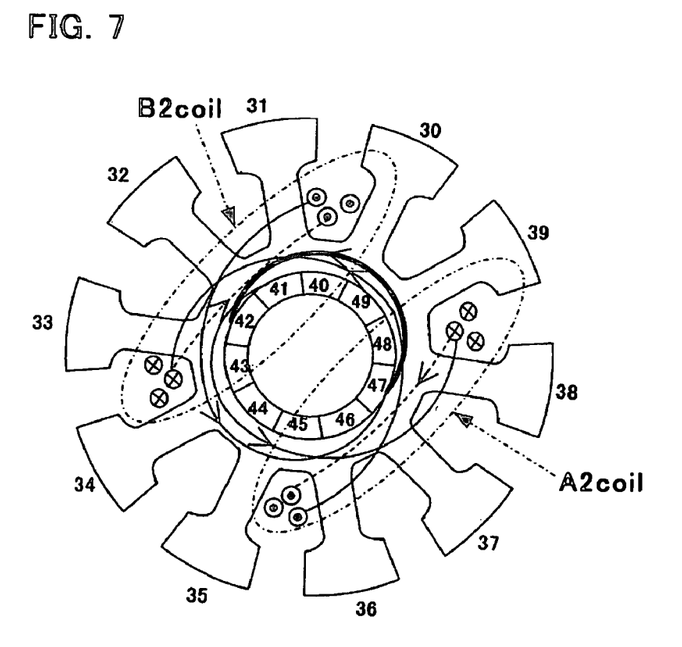
FIG. 7 illustrates the wiring of the wire of the second winding by showing the armature 133 and the commutator 137 in sectional view.

As shown in FIGS. 6 and 7, the second winding is formed by winding the wire from a starting-point segment or the segment 41, which defines the end-point segment of the first winding. The wire connected to the segment 40 is wound counterclockwise as viewed in FIG. 7, inserted through a slot between the teeth 38 and 39, passed over the teeth 38, 37, 36 and then inserted through a slot between the teeth 36 and 35. A coil A2 is formed by thus winding the wire eight turns between these slots.

Next, the wire is continuously wound counterclockwise, inserted through a slot between the teeth 34 and 33 (as shown by arrow c in FIG. 6), passed over the teeth 33, 32, 31 and then inserted through a slot between the teeth 31 and 30. A coil B2 is formed by thus winding the wire eight turns between these slots. The coil B2 is diametrically opposed to the coil A2 in the armature 133.

Then, the wire is wound counterclockwise again and connected to a relay segment or the segment 47. In this manner, by the wire connected to the segment 41, the coil A2 is formed and then the coil B2 is formed between the slots which are diametrically opposed to the slots for the coil A2 in the armature 133. Thus, the coil section of the second winding is formed with the coils A2 and B2 connected in series. Thereafter, the wire connected to the segment 47 is connected to an end-point segment of the second winding, or the segment 42 (as shown by arrow d in FIG. 6) and the segments 47 and 42 are equalized (an equalizing wire for the second winding is formed).

The "second winding" of this embodiment is a feature that corresponds to the "first unit winding" according to the invention. The segments 41, 47 and 42 correspond to the first to the third segments, respectively, in this invention. The coils A2 and B2 correspond to the "coil of first group" and the "coil of second group", respectively, according to the invention. Further, the coils A2 and B2 are formed "between the slot between the teeth 38 and 39 and the slot between the teeth 36 and 35" and "between the slot between the teeth 34 and 33 and the slot between the teeth 31 and 30", respectively. And such construction is represented as the coils being formed "around respectively predetermined slot groups of slots selected from the plurality of the slots".

Figure 8:
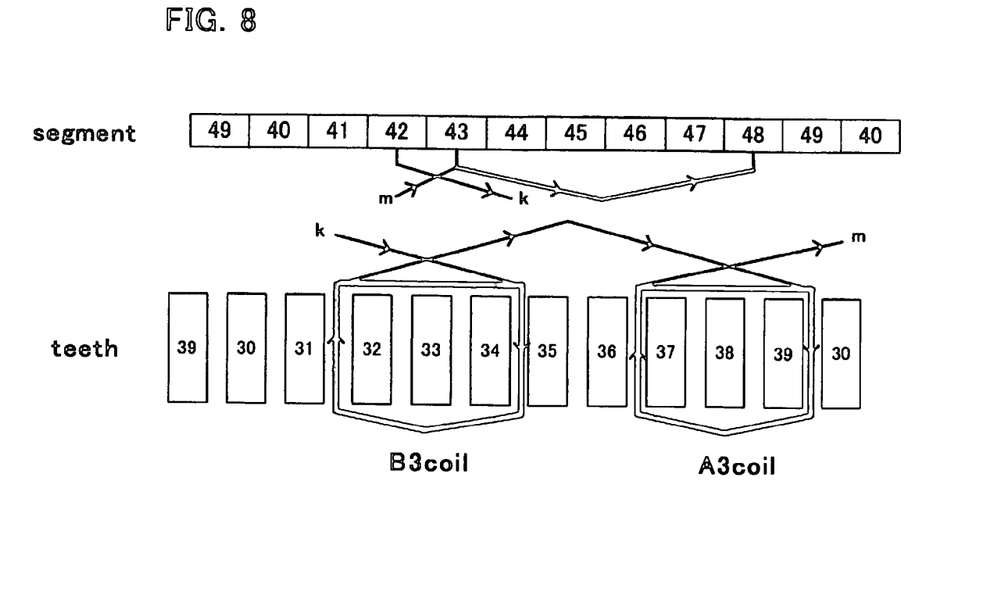
FIG. 8 illustrates the wiring of the wire of the third winding by showing the segments and slots in developed view.
Figure 9:
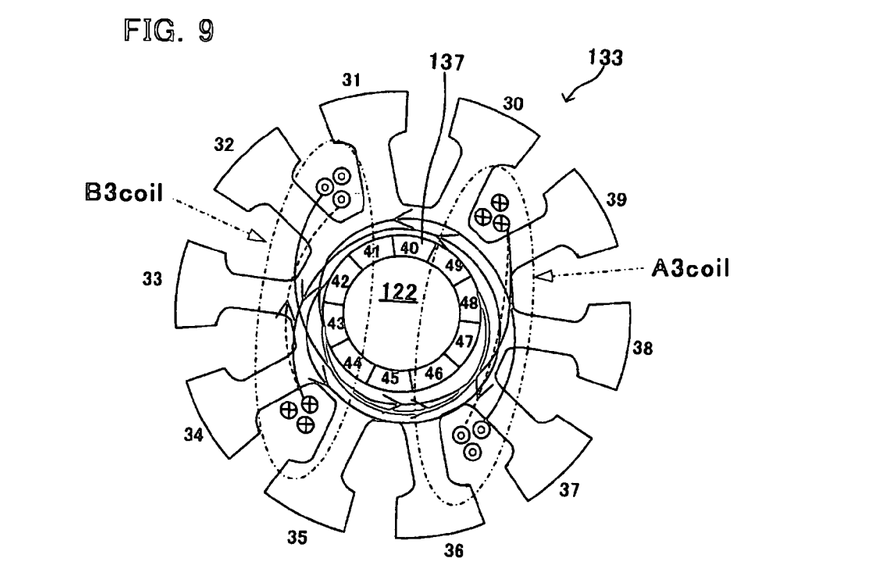
FIG. 9 illustrates the wiring of the wire of the third winding by showing the armature 133 and the commutator 137 in sectional view.

As shown in FIGS. 8 and 9, the third winding is formed by winding the wire from a starting-point segment or the segment 42, which serves as the end-point segment of the second winding. The wire connected to the segment 42 is neck-wound one turn around the output shaft 122 counterclockwise as viewed in FIG. 9, inserted through a slot between the teeth 35 and 34 (as shown by arrow k in FIG. 8), passed over the teeth 34, 33, 32 and then inserted through a slot between the teeth 32 and 31. A coil B3 is formed by thus winding the wire eight turns between these slots.

Next, the wire is continuously wound counterclockwise, inserted through a slot between the teeth 30 and 39, passed over the teeth 39, 38, 37 and then inserted through a slot between the teeth 37 and 36. A coil A3 is formed by thus winding the wire eight turns between these slots. The coil A3 is diametrically opposed to the coil B3 in the armature 133.

Then, the wire is wound counterclockwise again and connected to a relay segment or the segment 43 (as shown by arrow m in FIG. 8). In this manner, by the wire connected to the segment 42, the coil B3 is formed and then the coil A3 is formed between the slots which are diametrically opposed to the slots for the coil B3 in the armature 133. Thus, the coil section of the third winding is formed with the coils B3 and A3 connected in series. Thereafter, the wire coupled to the segment 43 is connected to an end-point segment of the third winding, or the segment 48, and the segments 43 and 48 are equalized (an equalizing wire for the third winding is formed).

The "third winding" of this embodiment is a feature that corresponds to the "second unit winding" according to the invention. The segments 42, 43 and 48 correspond to the third to the fifth segments, respectively, according to the invention. The coils A3 and B3 correspond to the "coil of first group" and the "coil of second group", respectively, according to the invention. Further, the coils A3 and B3 are formed "between the slot between the teeth 30 and 39 and the slot between the teeth 37 and 36" and "between the slot between the teeth 35 and 34 and the slot between the teeth 32 and 31", respectively. Such structure is represented as the coils being formed "around respectively predetermined slot groups of slots which are selected from the plurality of the slots in such a manner as to include some of the slots of the slot groups used to form the coils of the first and the second groups for the first unit winding".

Figure 10:
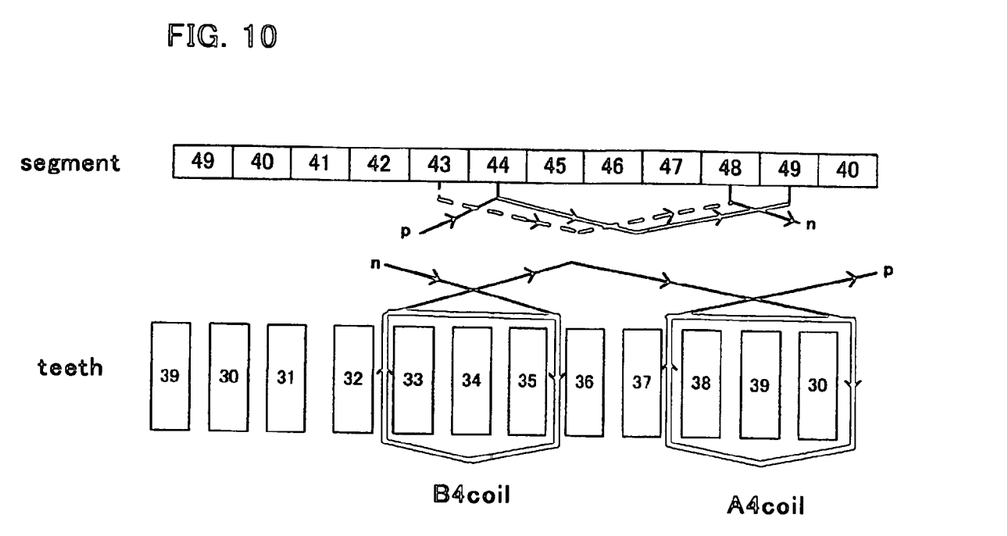
FIG. 10 illustrates the wiring of the wire of the fourth winding by showing the segments and slots in developed view.
Figure 11:
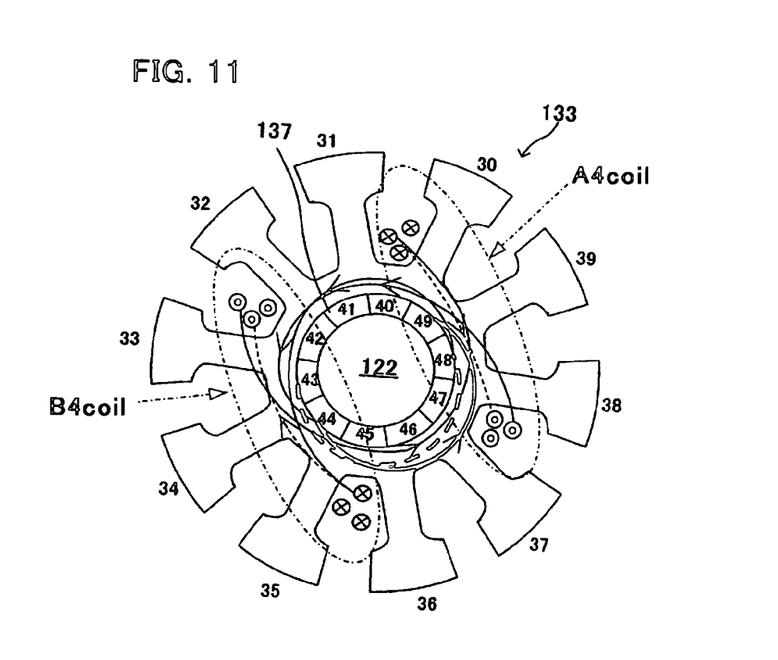
FIG. 11 illustrates the wiring of the wire of the fourth winding by showing the armature 133 and the commutator 137 in sectional view.

As shown in FIGS. 10 and 11, the fourth winding is formed by winding the wire from a starting-point segment or the segment 48, which defines the end-point segment of the third winding. The wire connected to the segment 48 is wound counterclockwise as viewed in FIG. 11, inserted through a slot between the teeth 36 and 35 (as shown by arrow n in FIG. 10), passed over the teeth 35, 34, 33 and then inserted through a slot between the teeth 33 and 32. A coil B4 is formed by thus winding the wire eight turns between these slots.

Next, the wire is continuously wound counterclockwise, inserted through a slot between the teeth 31 and 30, passed over the teeth 30, 39, 38 and then inserted through a slot between the teeth 38 and 37. A coil B4 is formed by thus winding the wire eight turns between these slots. The coil B4 is diametrically opposed to the coil A4 in the armature 133.

Then, the wire is wound counterclockwise again and connected to a relay segment or the segment 44 (as shown by arrow p in FIG. 10). In this manner, by the wire connected to the segment 48, the coil B4 is formed and then the coil A4 is formed between the slots which are diametrically opposed to the slots for the coil B4 in the armature 133. Thus, the coil section of the fourth winding is formed with the coils B4 and A4 connected in series. Thereafter, the wire connected to the segment 44 is connected to an end-point segment of the fourth winding, or the segment 49, and the segments 47 and 42 are equalized (an equalizing wire for the fourth winding is formed).

Figure 12:
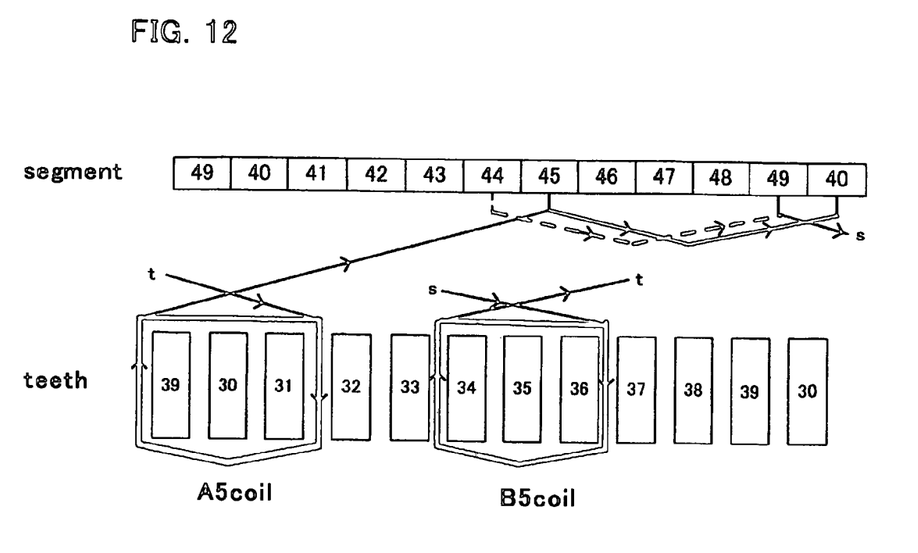
FIG. 12 illustrates the wiring of the wire of the fifth winding by showing the segments and slots in developed view.
Figure 13:
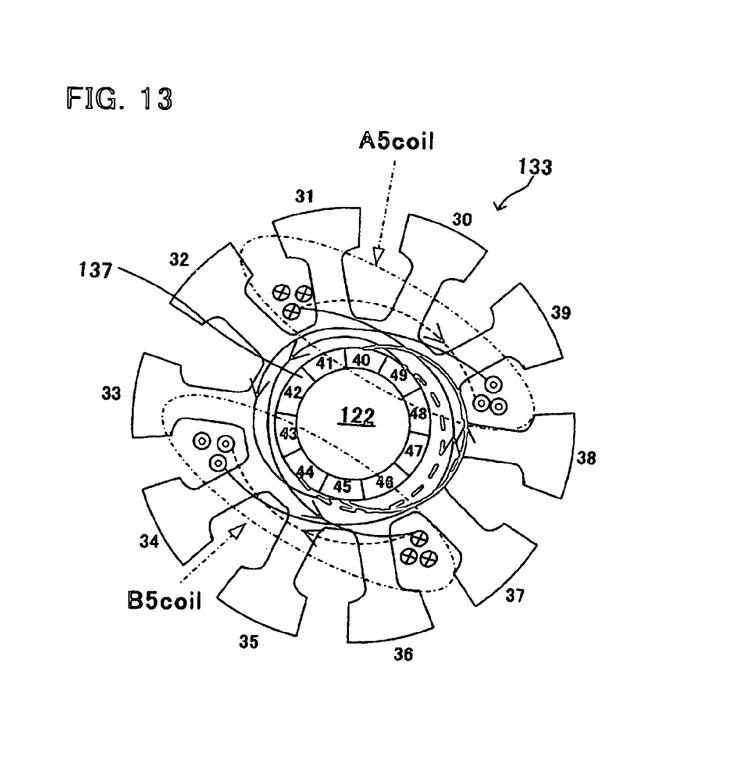
FIG. 13 illustrates the wiring of the wire of the fifth winding by showing the armature 133 and the commutator 137 in sectional view.

As shown in FIGS. 12 and 13, the fifth winding is formed by winding the wire from a starting-point segment or the segment 49, which serves as the end-point segment of the fourth winding. The wire connected to the segment 49 is wound counterclockwise as viewed in FIG. 13, inserted through a slot between the teeth 37 and 36 (as shown by arrow s in FIG. 12), passed over the teeth 36, 35, 34 and then inserted through a slot between the teeth 34 and 33. A coil B5 is formed by thus winding the wire eight turns between these slots.

Next, the wire is continuously wound counterclockwise, inserted through a slot between the teeth 32 and 31, passed over the teeth 31, 30, 39 and then inserted through a slot between the teeth 39 and 38. A coil A5 is formed by thus winding the wire eight turns between these slots. The coil A5 is diametrically opposed to the coil B5 in the armature 133. Then, the wire is wound counterclockwise again and connected to a relay segment or the segment 45. In this manner, by the wire connected to the segment 49, the coil B5 is formed and then the coil A5 is formed between the slots which are diametrically opposed to the slots for the coil B5 in the armature 133. Thus, the coil section of the fifth winding is formed with the coils B5 and A5 connected in series. Thereafter, the wire connected to the segment 45 is connected to an end-point segment of the fifth winding, or the segment 40, and the segments 45 and 40 are equalized (an equalizing wire for the fifth winding is formed).

By thus forming the first to the fifth windings, the coils A1, A2, A3, A4 and A5 of group A are formed in this order while shifting one slot in the circumferential direction around the axis of the armature 133. The coils B1, B2, B3, B4 and B5 of group B are also formed in this order while shifting one slot in the circumferential direction around the axis of the armature 133.

The wiring of the equalizing wires will now be explained. In the first winding (see FIG. 4), the relay segment to which the end of the coil section of the winding is connected is configured as the segment (segment 46) which is diametrically opposed to the segment (segment 41) adjacent to the starting-point segment (segment 40), and the endpoint segment is configured as the segment (segment 41) adjacent to the starting-point segment. Therefore, the equalizing wire is connected from the segment (segment 46) which is diametrically opposed to the segment adjacent to the starting-point segment to the segment (segment 41) adjacent to the starting-point segment. Specifically, the segment (segment 41) adjacent to the starting-point segment serves as the endpoint segment of the first winding and also serves as the starting-point segment of the second winding. Likewise, in the second winding (see FIG. 6), the segment (segment 42) adjacent to the starting-point segment (segment 41) serves as the end-point segment of the second winding and also serves as the starting-point segment of the third winding.

In the third winding (see FIG. 8), the relay segment to which the end of the coil section of the winding is connected is configured as the segment (segment 43) which is adjacent to the starting-point segment (segment 42), and the endpoint segment is configured as the segment (segment 48) which is diametrically opposed to the segment adjacent to the starting-point segment. Therefore, the equalizing wire is connected from the segment (segment 43) adjacent to the starting-point segment to the segment (segment 48) which is diametrically opposed to the segment adjacent to the starting-point segment. Specifically, the segment (segment 48) diametrically opposed to the segment adjacent to the starting-point segment defines the endpoint segment of the third winding and also defines the starting-point segment of the fourth winding. Likewise, in the fourth winding (see FIG. 10), the segment (segment 49) adjacent to the starting-point segment (segment 48) defines the endpoint segment of the fourth winding and also defines the starting-point segment of the fifth winding. In the fifth winding (see FIG. 12), the segment (segment 40) adjacent to the starting-point segment (segment 49) defines the endpoint segment of the fifth winding and also defines again as the starting-point segment of the first winding. In this manner, the armature winding 134 is formed by the wire connected to each of the segments of the commutator 137. In this case, the segments 41, 42, 48 and 49 define the starting-point segments of the first to the fifth windings, respectively.

Figure 14:
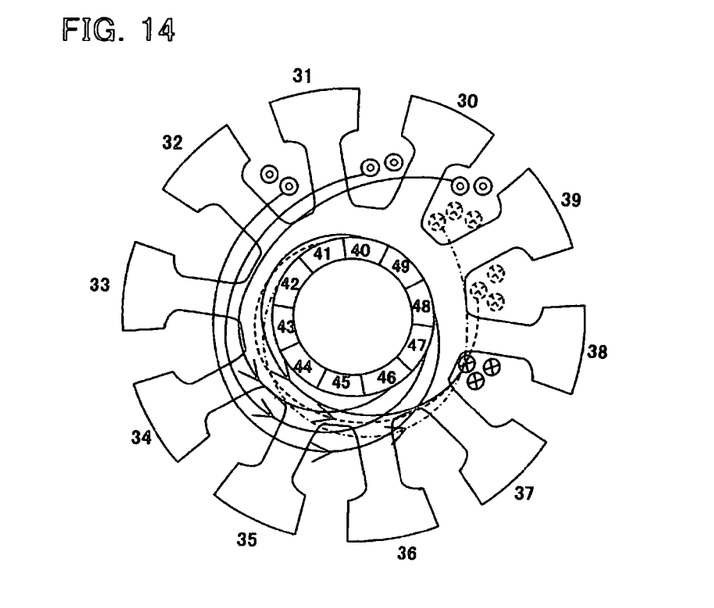
FIG. 14 illustrates an example of wiring in which wires regularly overlap each other so that imbalance is created in the volume of the wires wound between the segments and the slots.
Figure 15:
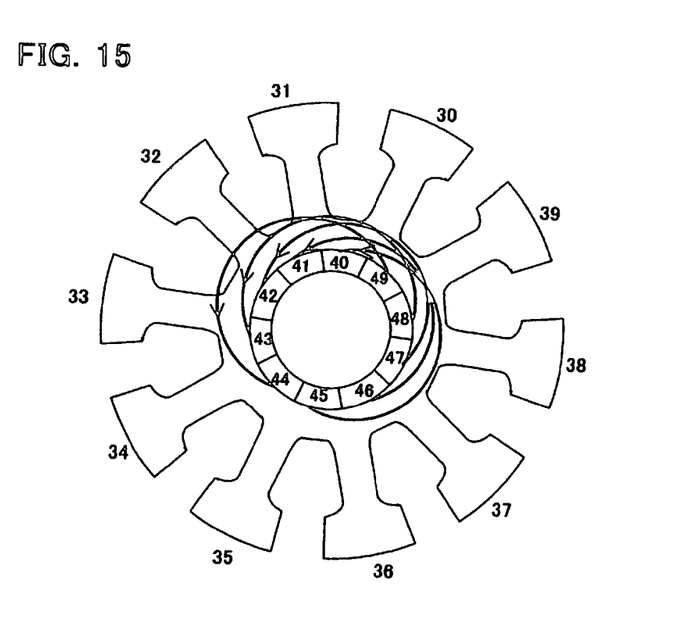
FIG. 15 illustrates an example of wiring in which wires regularly overlap each other so that imbalance is created in the volume of the wires wound between the segments and the slots.

If the first to the fifth windings are formed by sequentially connecting the wire from the starting-point segment shifted by one segment from the preceding winding in the circumferential direction around the axis of the commutator 137 to the slot shifted by one slot from the preceding winding in the circumferential direction around the axis of the armature 133, so that the coils of the same group A are always formed by the wires connected to the starting-point segments of the windings, as shown in FIG. 14, regular overlaps of the wire tend to take place. FIG. 14 shows the first to the third windings formed in this manner, with the wires shown connected from a segment to a slot or from a slot to a segment. As clearly seen from FIG. 14, if all of the five windings are formed in this wiring manner as shown in the drawing, particularly near the segments 45 to 47, the wires connected between the commutator 137 and the armature 133 will tend to overlap each other, so that the wire volume increases. Further, FIG. 15 shows the equalizing wires of the windings formed in this manner. As seen from FIG. 15, incoming equalizing wires gather near the segments 40 to 42 diametrically opposed to the region near the segments 45 to 47 in which the wire volume increases. As shown in FIG. 16, near the incoming region of the equalizing wires, the wires connected from the segments to the slots is lifted up toward the commutator 137 by the equalizing wires and tightened up toward the output shaft 122. As a result, the wire volume tends to be reduced near the incoming region of the equalizing wires. As shown in FIG. 17, however, near the outgoing region of the equalizing wires, the wire volume does not tend to be reduced by the equalizing wires. Therefore, if the wires are sequentially connected in regular order as shown in FIG. 14, the wire volume will tend to get larger in the region near the segments 45 to 47 than in the region near the segments 40 to 42, so that imbalance in the wire volume is created.

Therefore, when forming the windings according to the representative embodiment, the order in which the coils are connected to the starting-point segment is changed starting from the third winding. Further, the order in which the segments are connected by the equalizing wire is changed starting from the third winding. In other words, a segment shifted by one segment from a starting-point segment of a preceding winding in the circumferential direction around the axis of the commutator 137 is not uniformly configured as a starting-point segment. FIG. 18 shows the first to the fourth windings of the armature winding 134 formed according to this embodiment, with the wires shown connected from a segment to a slot or from a slot to a segment.

According to the representative embodiment, the wire volume in the region near the segments 40 to 42 is larger than that shown in FIG. 14 so that the balance between the wire volume in the region near the segments 40 to 42 and the wire volume in the region near the segments 45 to 47 is improved. Thus, in the driving motor 121 of this embodiment, the wire is irregularly wound between the commutator 137 and the armature 133 in order to avoid the above-mentioned problem that the wires connected between the commutator 137 and the armature 133 regularly overlap each other and thus resulting imbalance in the wire volume.

Further, the representative embodiment prevents a further problem that the rotor formed by the output shaft 122, the armature 133, the commutator 137 and the armature winding 134 has an imbalance in weight and thus the center of rotation of the rotor is displaced from the output shaft. Therefore, in the process of manufacturing the motor, it is not necessary to take time for adjustment of the balance, for example, by reducing the weight by partially cutting away the commutator 137 or the armature 133, or by partially increasing the weight by using putty. Thus, the motor can be efficiently manufactured.

Further, according to the embodiment, the wire winding order is changed only once starting from the third winding. Generally, the user winds a wire by using a winding machine in order to form the armature winding 134. A winding machine is capable of forming an armature winding with higher efficiency if the wire winding order is changed a fewer number of times. Therefore, according to the motor of the representative embodiment, not only the wire can be wound between the commutator 137 and the armature 133 in good balance, but the armature winding 134 can be relatively efficiently formed.

The numbers of poles and brushes of the motor are not limited to the one of the representative embodiment. For example, the motor may be of six-pole two-brush type. In such a case, each of the coil sections of the armature winding includes three coils of group A, group B and group C connected in series and three segments are connected by an equalizing wire. In this case, for example, as for the first predetermined number of windings, the coil section is formed by winding the wire in the order of group A-group B-group C, and as for the subsequent windings, the coil section is formed in the order of group C-group B-group A. The order in which the groups of the coils are formed, or the winding starting from which the coils are formed in a changed order is appropriately determined such that imbalance in the wire volume does not tend to be created. The order in which the segments are connected by a wire or equalizing wire is also determined likewise.

In forming the first to the fifth windings, the order in which the coils are formed may be changed more than once. Further, the order in which the segments are connected by an equalizing wire is described according to the representative embodiment as being also changed when the coils are formed in a changed order. However, the effect of the invention can be obtained solely by changing the order in which the coils are formed.

Further, the step of forming the coils and the step of forming the equalizing wires are described according to the representative embodiment as being alternately repeated to obtain the armature winding 134. However, such method of forming the armature winding can also be applied to the case in which the equalizing wires are separately formed (including the case in which segments are connected not by a wire but by a connecting conductor). Further, the invention is described according to the representative embodiment as being applied to the motor disposed in the impact driver 100. However, the motor manufacturing method of the invention can be widely applied to motors for other devices.

DESCRIPTION OF NUMERALS 100 impact driver
101 body
103 motor housing
105 gear housing
107 handgrip
109 driver bit
111 speed reducing mechanism
112 spindle
113 ball
114 hammer
115 anvil
116 compression coil spring
121 driving motor
122 output shaft
123, 124 bearing
125 trigger
127 battery
133 armature
134 armature winding
135 stator
137 commutator
145 brush

I claim:

1. A motor comprising:
an armature
a plurality of slots provided on the armature in the circumferential direction around an axis of the armature,
a commutator that rotates together with the armature,
a plurality of segments provided on the commutator in the circumferential direction around the axis of the commutator and
an armature winding having at least a first and a second unit windings formed between the armature and the segments, wherein:
the first unit winding is defined by a first, a second and a third segments of the plurality of the segments, a coil of a first group and a coil of a second group for the first unit winding which are formed by winding the wire around respectively predetermined slot groups of slots selected from the plurality of the slots, and a first equalizing wire,
the first segment defines a starting point of the first unit winding,
the coil of the first group for the first unit winding and the coil of the second group for the first unit winding are connected in series in this order by winding the wire from the first segment to the second segment,
the first equalizing wire is connected from the second segment to the third segment that defines an endpoint of the first unit winding,
the second unit winding is defined by a third, a fourth and a fifth segments of the plurality of the segments, a coil of a first group and a coil of a second group for the second unit winding, and a second equalizing wire, the coils of the first and the second groups of the second unit winding being formed by winding the wire around respectively predetermined slot groups of slots which are selected from the plurality of the slots in such a manner as to include some of the slots of the slot groups used to form the coils of the first and the second groups of the first unit winding, the coils of the first and the second groups for the second unit winding being disposed in a position shifted from the coils of the first and the second groups for the first unit winding in the circumferential direction around the axis of the armature,
the third segment defines an endpoint of the first unit winding and also defines a starting point of the second unit winding,
the coil of the second group for the second unit winding and the coil of the first group for the second unit winding are connected in series in this order by winding the wire from the third segment to the fourth segment,
the second equalizing wire is connected from the fourth segment to the fifth segment that defines an endpoint of the second unit winding, and
wherein the first and the second unit windings are provided in which the groups of coils in one unit winding are connected from a starting-point segment to an endpoint segment in a different order from the group of coils in the other unit winding such that the wires connected between the commutator and the armature is prevented from regularly overlapping each other so as to avoid imbalance due to the increased wire volume.

2. A motor comprising:
an armature
a plurality of slots provided on the armature in the circumferential direction around an axis of the armature,
a commutator that rotates together with the armature,
a plurality of segments provided on the commutator in the circumferential direction around the axis of the commutator and
an armature winding having at least a first and a second unit windings formed between the armature and the segments, wherein:
the first unit winding is defined by a first, a second and a third segments of the plurality of the segments, a coil of a first group and a coil of a second group for the first unit winding which are formed by winding the wire around respectively predetermined slot groups of slots selected from the plurality of the slots, and a first equalizing wire,
the first segment defines a starting point of the first unit winding,
the coil of the first group for the first unit winding and the coil of the second group for the first unit winding are connected in series in this order by winding the wire from the first segment to the second segment,
the first equalizing wire is connected from the second segment to the third segment that defines an endpoint of the first unit winding,
the second unit winding is defined by a third, a fourth and a fifth segments of the plurality of the segments, a coil of a first group and a coil of a second group for the second unit winding, and a second equalizing wire, the coils of the first and the second groups of the second unit winding being formed by winding the wire around respectively predetermined slot groups of slots which are selected from the plurality of the slots in such a manner as to include some of the slots of the slot groups used to form the coils of the first and the second groups of the first unit winding, the coils of the first and the second groups for the second unit winding being disposed in a position shifted from the coils of the first and the second groups for the first unit winding in the circumferential direction around the axis of the armature,
the third segment defines an endpoint of the first unit winding and also defines a starting point of the second unit winding,
the coil of the second group for the second unit winding and the coil of the first group for the second unit winding are connected in series in this order by winding the wire from the third segment to the fourth segment, the second equalizing wire is connected from the fourth segment to the fifth segment that defines an endpoint of the second unit winding, and wherein the third segment of the first unit winding is disposed adjacent to the first segment and the fourth segment of the second unit winding is disposed adjacent to the third segment.

* * * * *